United States Patent Office 3,165,477
Patented Jan. 12, 1965

3,165,477
PROCESS FOR INHIBITING FOAMING IN AN AQUEOUS FLUID
Robert E. Crowe, Midland, Mich., and Bartolome Garcia, Jr., Lake Jackson, Tex., assignors to The Dow Chemical Company, Midland, Mich., a corporation of Delaware
No Drawing. Filed Jan. 10, 1962, Ser. No. 165,318
6 Claims. (Cl. 252—321)

This invention relates to methods and materials for reducing or preventing the foaming of aqueous fluids having a strong tendency to produce foam.

The term "antifoam agent" as used herein includes agents which reduce or destroy foam as well as those which inhibit the formation of foam.

According to the invention, foaming of aqueous fluids is inhibited or suppressed by the addition to such fluids of a small proportion of a hydrophobic polyoxyalkylenamine.

The antifoam agents of the invention are exemplified by the compounds corresponding to the formula $$R(OA)_n-NH_2$$

wherein R is H, $-ANH_2$ or a hydrocarbon radical containing up to about 18 carbon atoms, A is an alkylene radical containing 3 to 4 carbon atoms and $n$ is an integer from about 5 to 100 or more. Many such compounds, and methods for making such compounds, are disclosed in the copending application of Robert E. Crowe and Joel M. Leathers, filed November 2, 1960, Serial No. 66,706, now abandoned, and others are known or can be made by the same general methods.

The preferred antifoam agents are those having only slight solubility in water; i.e., not more than a few percent and preferably less than 1%. For this reason, when $n$ in the above formula is less than about 10, the radical R is preferably a hydrocarbon radical rather than an amino or hydroxyl radical. Suitable hydrocarbon radicals include alkyl, phenyl, alkylphenyl and phenylalkyl radicals containing up to at least about 18 carbon atoms.

While the above formula indicates that the oxyalkylene groups in the antifoam agents are oxypropylene or oxybutylene groups, it is to be understood that the compounds can be modified by the presence of minor proportions of other oxyalkylene groups. Thus, up to about 10% of oxyethylene radicals may be included, particularly in the compounds in which R is a strongly hydrophobic group, such as a hydrocarbon radical containing four or more carbon atoms, and/or when $n$ is a large number; i.e., at least about 20.

Antifoam agents of the type set forth above are characterized by a wide spectrum of applications. This versatility makes them especially useful in the chemical, mining, textile, paper and food processing industries in such operations as defoaming boiler water, sewage, laundry effluents, dye baths, textile-scouring process effluents, aqueous ore flotation and processing effluents, food processing and cannery waste effluents, brewery wastes, slaughterhouse wastes, and the like, and in general, in defoaming aqueous fluids in which undesirable foam tends to be troublesome.

Only minute amounts of our defoamers are needed for most applications. For some applications, as little as 0.01% or even less, is effective. For others, as much as 1%, or more, may be advantageously used. It is, of course, a simple matter to determine how much is needed and can be economically justified in a particular application. As is true of most defoamers, it may sometimes happen that if an amount in excess of the optimum is used there is a lessening of effectiveness and a point might even be reached at which the additive actually increases the formation of foam rather than decreasing it.

The defoaming of neutral or acidic aqueous fluids poses a particularly difficult problem, especially in such operations as sewage treatment and disposal of waste effluents from textile treating plants, food processing plants, dairies, and the like.

For the determination of the effectiveness of the polyoxyalkylenamines as defoamants in aqueous environments having a pH less than 7, such as those of sewage plants, the following testing method was used. This method of testing was obtained from U.S. Patent No. 2,854,417 and has been found to be correlative with commercial scale operations. Twenty ml. of an aqueous solution containing about 0.05 weight percent of a foam-producing agent (Tide, a commercial high-foaming detergent containing a mixture of alkylaryl sulfonate and fatty alcohol sulfates) are placed in a 100 ml. graduated stoppered cylinder. One drop (approximately 0.05 ml.) of the defoamer is added. The cylinder is then stoppered and shaken at the rate of one shake per second for a one-minute period. Immediately after the shaking is stopped the initial reading is taken. This reading is the total volume of liquid plus foam that is present in the cylinder. Subsequent readings are then taken at intervals of 10, 20, 30, and 60 seconds after the shaking operation has been stopped. Any defoamant that produces less than about 30 ml. total volume of liquid and foam in the test is a satisfactory defoamant for use in acidic environments such as those of sewage disposal plants.

Table I shows some typical results obtained by use of the above test wherein the defoamer corresponded to the formula $$H_2N-A-(OA)_n-NH_2$$

wherein A is a 1,2-propylene or a butylene radical and $n$ is an integer such that the compound as a whole had an average molecular weight as shown in the table. The butylene radicals were a random mixture of about 80% 1,2- and 20% 2,3-isomers.

Table I.—Effectiveness of Defoamers $$H_2N-A-(OA)_n-NH_2$$

| Example | Defoamer | | Volume, Foam and Liquid, at Time, Seconds | | | | |
|---|---|---|---|---|---|---|---|
| | A | Average Mol. Weight | 0 | 10 | 20 | 30 | 60 |
| | None | | 38 | 38 | 38 | 38 | 38 |
| 1 | Propylene | 250 | 25 | 25 | 25 | 25 | 25 |
| 2 | do | 750 | 29 | 28 | 20 | 20 | 20 |
| 3 | do | 1,200 | 24 | 24 | 24 | 24 | 24 |
| 4 | do | 2,000 | 20 | 20 | 20 | 20 | 20 |
| 5 | do | 3,000 | 22 | 22 | 22 | 22 | 22 |
| 6 | do | 4,000 | 22 | 22 | 22 | 22 | 22 |
| 7 | Butylene | 500 | 21 | 21 | 21 | 21 | 21 |

In another series of tests similar to those above, a different high-foaming surfactant, Nacconol NR, was used. This is a commercial surfactant the principal active ingredient of which is alkylbenzene sulfonate. Results are shown in Table II.

Table II—Effectiveness of Defoamers $$H_2N—A—(OA)_n—NH_2$$

| Example | Defoamer | | Volume, Foam and Liquid, at Time, Seconds | | | | |
|---|---|---|---|---|---|---|---|
| | A | Average Mol. Weight | 0 | 10 | 20 | 30 | 60 |
| Control | None | | 56 | 56 | 55 | 54 | 54 |
| 8 | Propylene | 1,200 | 26 | 27 | 27 | 27 | 28 |
| 9 | do | 2,000 | 21 | 21 | 21 | 21 | 21 |
| 10 | do | 3,000 | 23 | 22 | 22 | 22 | 21 |
| 11 | do | 4,000 | 23 | 23 | 23 | 23 | 23 |
| Control [a] | None | | 84 | 85 | 85 | 85 | 85 |
| 12 | Butylene | 500 | 21 | 21 | 21 | 21 | 20 |
| 13 | do | 1,000 | 23 | 23 | 23 | 22 | 22 |

[a] The experiments following Example 11 were run with the same surfactant but the foam height of the control was greater.

In another series of experiments, one liter of a 0.05% aqueous solution of a commercial high-foaming laundry soap was placed in a one-gallon glass jug and the jug was then shaken at the rate of one shake per second for a period of one minute. One drop (about 0.05 ml.) of the defoamer to be tested was then added to the solution and the shaking repeated. If after one minute of shaking the foam had not been completely suppressed, another drop of defoamer was added and the procedure repeated until foam was eliminated. The number of drops of defoamer required for this is shown in Table III. For purposes of comparison, a commercial silicone product recommended and widely sold as a defoamer was also tested. Even when as much as 10 drops of the latter was used there remained a thin layer of foam which could not be eliminated by the use of more silicone.

A series of tests similar to those of Table II was run in which the pH of the test solutions ranged from 1 to 13 in 1-unit steps. The desired pH was attained by addition of HCl or NaOH. No significant differences in defoaming properties were observed except that at pHs above about 11 there was a slight drop in effectiveness, though the defoaming activity remained adequate even at the higher pH ranges.

Table III.—Effectiveness of Defoamers $$H_2N—A—(OA)_n—NH_2$$

| Example | A | Average Molecular Weight | No. Drops Required |
|---|---|---|---|
| 14 | Propylene | 750 | 7 |
| 15 | do | 2,000 | 3 |
| 16 | do | 750 (mixture) / 2,000 | 2 / 2 |
| 17 | Butylene | 500 | 10 |
| | Silicone | | 10 |

Effective defoaming action is obtained when other polyoxyalkylenamines within the hereinbefore defined genus are used instead of those shown in the above examples. Among such are the alkyl and aryl monoethers of the polyoxyalkylene mono-amines, i.e., those corresponding to the formula $$R(OA)_n—NH_2$$

wherein R is an alkyl, phenyl or other hydrocarbon radical. Suitable radicals include methyl, butyl, octyl, dodecyl, octadecyl, phenyl, tolyl, xylyl, t-butylphenyl, nonylphenyl, dodecylphenyl and the like. It is preferred that R be a hydrocarbon radical when $n$ is a small number since such radicals increase the hydrophobicity of the compounds and increase their effectiveness.

While in the above examples the antifoam agents were added to aqueous solutions of foam-producing materials to defoam the latter, they can also be used to prevent foam by putting them into aqueous solutions which otherwise would later develop foam. Likewise, they can be mixed with materials which are later to be put into aqueous solutions and which otherwise would produce foam in such solutions. As an example of the latter use, the antifoam agents may be incorporated into detergent compositions to reduce the foam-forming properties of such detergents. This is particularly desirable in detergents intended for use in mechanical dish-washers, laundry washing machines and the like.

We claim:

1. The process for inhibiting foaming in an aqueous fluid having a tendency to foam, said process comprising dispersing in said fluid a small but effective proportion of an antifoam compound having the formula $$R(OA)_n—NH_2$$

wherein R represents a radical selected from the group consisting of —$ANH_2$ and hydrocarbon radicals containing up to about 18 carbon atoms, A represents an alkylene radical containing 3 to 4 carbon atoms and $n$ is an integer from about 5 to about 100.

2. The process defined in claim 1 wherein the compound has the formula $$H_2N—A—(OA)_n—NH_2$$

3. The process defined in claim 2 wherein A represents a butylene radical.

4. The process defined in claim 2 wherein A represents a propylene radical.

5. The process defined in claim 4 wherein $n$ is an integer such that the molecular weight of the compound is about 400 to about 4000.

6. The process defined in claim 4 wherein the molecular weight is about 2000.

References Cited in the file of this patent

UNITED STATES PATENTS

| | | |
|---|---|---|
| 2,229,024 | Bruson | Jan. 21, 1941 |
| 2,285,419 | Dickey et al. | June 9, 1942 |
| 2,400,543 | Denman | May 21, 1946 |
| 2,701,239 | Ryznar | Feb. 1, 1955 |
| 2,928,877 | Jaul et al. | Mar. 15, 1960 |